United States Patent Office 3,745,010
Patented July 10, 1973

3,745,010
PHOTOGRAPHIC ELEMENT COMPRISING ULTRA-VIOLET-ABSORBING POLYMERS
Wilhelmus Janssens, Aarschot, and Armand Maria Van den Bergh, Berchem, Belgium, assignors to Agfa-Gevaert, N.V., Mortsel, Belgium
No Drawing. Filed May 17, 1971, Ser. No. 144,233
Claims priority, application Great Britain, June 9, 1970, 27,978/70
Int. Cl. G03c 1/84
U.S. Cl. 96—84 R
10 Claims

ABSTRACT OF THE DISCLOSURE

The invention claims an ultraviolet-absorbing filter layer composition formed from an aqueous solution of a hydrophilic colloid having dispersed therein a hydrophobic copolymer obtained by emulsion polymerization of at least one $\alpha,\beta$-ethylenically unsaturated monomer and of an ultraviolet-absorbing, solid, water-insoluble monomer of the formula:

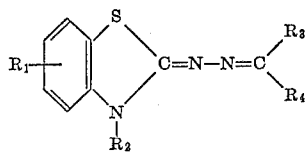

wherein:

$R_1$=hydrogen, (meth)acryloyloxy or (meth)acryloylamino,
$R_2$=hydrogen, methyl, ethyl or phenyl,
$R_3$=hydrogen, alkyl or phenyl,
$R_4$=hydrogen, (meth)acryloyloxy - substituted phenyl, (meth)acryloylamino-substituted phenyl, (meth)acryloyloxyalkoxy-substituted phenyl.

The ultraviolet-absorbing filter layer composition may be used for the protection of light-sensitive photographic materials against ultraviolet light and for the production of ultraviolet-absorbing filters and filter layers.

---

The present invention relates to ultraviolet-absorbing polymers, their use for the protection of light-sensitive photographic materials, their use for the production of ultraviolet filters and filter layers, and as industrial products, to the protecting filters and photographic materials protected from the injurious effects of ultraviolet radiation by the aid of these polymers.

Photographic light-sensitive elements can be protected from the injurious effect of light by mixing ultraviolet-absorbing compounds with the light-sensitive compositions or by providing special filter layers containing the ultraviolet-absorbing polymer. If the photographic element is intended for use in colour photography, the ultraviolet filter layer need not be an outer layer, but may be an interlayer i.e. a layer provided under the layer or layers that do not require protection and over the layer or layers that need protection. Ultraviolet-absorbing polymers may also be incorporated into the support (paper or film) or the support may be provided with an ultraviolet-absorbing filter layer before the light-sensitive emulsion layer or layers are applied thereto, in order to minimize the reflectance of light from the surface of the support.

In United States patent specification 3,417,082 compounds of the benzoxazole, benzoselenazole, benzothiazole and benzimidazole series are described adapted to be used as ultraviolet radiation-filtering agents. Preferred compounds are represented by the formula:

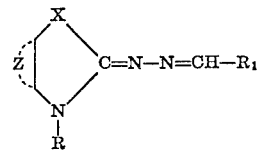

wherein X is sulphur or selenium, R is a lower alkyl group comprising from 1 to 5 carbon atoms, $R_1$ is a mono-, bis-, or tri-lower alkoxyphenyl group or naphthyl group, and Z represents the atoms necessary to complete a benzene ring. These ultraviolet-absorbing compounds are incorporated into the filter layers by dissolving them in a solvent medium together with a hydrophilic colloidal binder such as gelatin.

When these ultraviolet-absorbing compounds are water-soluble they are far from being non-migratory in gelatin layers and can easily be washed out in the photographic baths. When they are not soluble in water, however, organic solvents are to be used that may be miscible or immiscible with the water, which is generally used as the solvent for the hydrophilic binder material. Moreover, the organic solvents are to be eliminated so that special recovery units are needed. Further, by the addition of the compounds in the form of solutions in organic solvents to aqueous gelatin solutions, the viscosity of the coating composition increases in such a way that coating to layers becomes very difficult.

It has now been found that ultraviolet-absorbing groups of the benzoxazole, benzoselenazole, benzothiazole and benzimidazole series can be introduced very conveniently into photographic ultraviolet-absorbing layers and in ultraviolet-absorbing photographic filters as substituents of ultraviolet-absorbing copolymers.

According to the invention an ultraviolet-absorbing filter layer composition is provided that is formed from a mixture of an aqueous solution of a hydrophilic colloid binder material and a primary dispersion having a concentration of 5 to 60% by weight of a hydrophobic ultraviolet-absorbing copolymer obtained by emulsion polymerization of at least one $\alpha,\beta$-ethylenically unsaturated monomer with an ultraviolet-absorbing, solid, water-insoluble monomer of the formula:

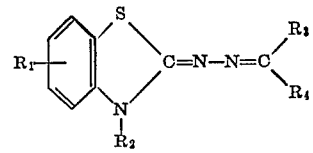

wherein $R_1$ represents a hydrogen atom, an acryloyloxy group, a methacryloyloxy group, an acryloylamino group, or a methacryloylamino group,
$R_2$ represents a hydrogen atom, a methyl group, an ethyl group, or a phenyl group,
$R_3$ represents a hydrogen atom, an alkyl group of 1 to 4 carbon atoms, or a phenyl group, and
$R_4$ represents a hydrogen atom, or, when $R_1$ is a hydrogen atom, an acryloyloxy- or methacryloyloxy-substituted phenyl group; an acryloylamino- or methacryloylamino-substituted phenyl group, an acryloyloxyalkoxy- or methacryloyloxyalkoxy-substituted phenyl group, wherein these phenyl groups may comprise a further substituent taken from a hydroxy group or an alkoxy group of 1 to 4 carbon atoms;

said ultraviolet-absorbing monomer constituting between about 2 and 70% by weight of total monomer present, and said hydrophobic copolymer forming between 8 and 40% by weight of the total weight of dry ultraviolet-absorbing filter layer.

By primary dispersions latices are understood that have been prepared directly by emulsion polymerization of monomers in aqueous medium, contrary to secondary latices that have been obtained by dispersing preformed polymers in water, irrespective of the manner wherein the polymers themselves have been prepared. These secondary latices can be prepared for instance by dissolving the polymers in an organic medium that is immiscible with water, dispersing the resulting solution in water and distilling the organic solvent whilst stirring.

The primary dispersions of the ultraviolet-absorbing hydrophobic copolymers of the invention are prepared by the emulsion copolymerization process described in our United Kingdom patent specification 1,130,581. This process comprises the steps of:

(a) Dispersing the water-insoluble, solid, ultraviolet-absorbing monomer in water containing known emulsifying agents, together with a solvent for the monomer and possibly with at least one other $\alpha,\beta$-ethylenically unsaturated monomer, the solvent being taken from (i) organic solvents that are inert in respect of the ultraviolet-absorbing monomer and that do not interfere with the free radical addition polymerization thereof,
(ii) liquid, water-insoluble, ethylenically unsaturated monomers that are copolymerizable with the ultraviolet-absorbing monomer, and
(iii) mixtures of (i) and (ii);

(b) Adding to the liquid dispersion obtained by step (a) a known polymerization initiator, and (c) Agitating under free radical polymerization conditions until copolymerization has occurred.

According to the above-mentioned process the comonomer(s) may be liquid comonomer(s) and in some cases they may serve as solvent for the normally solid monomer. The comonomer(s) may be selected to confer certain required properties on the water-insoluble copolymer.

These and other data including examples of polymerization initiators, emulsifying agents, and suitable solvents as well as instructions relating to the formation of the initial emulsions and/or suspensions are fully set out in said United Kingdom patent specification and need not be repeated here in detail.

Among the polymerization initiators that are suited for use in the above emulsion polymerization process may be mentioned: persulphates, e.g. ammonium and potassium persulphate, azonitrile compounds, e.g. 4,4'-azobis(4-cyanovaleric acid) as well as peroxide compounds, e.g. benzoyl peroxide and hydrogen peroxide.

As has been disclosed in the above United Kingdom patent specification, surface-active compounds of various classes and that are known per se are available for use as emulsifying agents, i.e. soaps, sulphonates, and sulphates, cationic and amphoteric compounds and high-molecular weight protective colloids.

The latices obtained have a concentration of 5 to 60% by weight of ultraviolet-absorbing copolymer, whereas the copolymer itself comprises between 2 and 70% by weight of polymerized ultraviolet-absorbing monomer.

Ultraviolet-absorbing, solid, water-insoluble monomers suited for emulsion copolymerization with other $\alpha,\beta$-ethylenically unsaturated monomers to form hydrophobic, ultraviolet-absorbing copolymers are:

4-(methacyloyloxy)-benzylidene-3'-methyl-2'-N-benzothiazolo-azine
3-(methacryloyloxy)-benzylidene-3'-methyl-2'-N-benzothiazolo-azine
$\alpha$-methyl-3-(methacryloyloxy)-benzylidene-3'-methyl-2'-N-benzothiazolo-azine
3-methoxy-4-(methacryloyloxy)-benzylidene-3'-methyl-2'-N-benzothiazolo-azine
$\alpha$-phenyl-2-hydroxy-4-(methacryloyloxy)-benzylidene-3'-methyl-2'-N-benzothiazolo-azine
$\alpha$-methyl-4-(methacryloyloxy)-benzylidene-3'-methyl-2'-N-benzothiazolo-azine
4-($\beta$-methacryloyloxy-ethoxy)-benzylidene-3'-methyl-2'-N-benzothiazolo-azine
2-($\beta$-methacryloyloxy-ethoxy)-benzylidene-3'-methyl-2'-N-benzothiazolo-azine
3-methoxy-4-($\beta$-metacryloyloxy-ethoxy)-benzylidene-3'-methyl-2'-N-benzothiazolo-azine
$\alpha$-methyl-4-($\beta$-methacryloyloxy-ethoxy)-benzylidene-3'-methyl-2'-N-benzothiazolo-azine
$\alpha$-methyl-4-(methacryloylamino)-benzylidene-3'-methyl-2'-N-benzothiazolo-azine
$\alpha$-methyl-2-(methacryloylamino)-benzylidene-3'-methyl-2'-N-benzothiazolo-azine
3-(methacryloylamino)-benzylidene-3'-methyl-2'-N-benzothiazolo-azine
$\alpha$-methyl-3-(methylacryloylamino)-benzylidene-3'-methyl-2'-N-benzothiazolo-azine
$\alpha$-methyl-benzylidene-3'-methyl-6'-(methacryloylamino)-2'-N-benzothiazolo-azine
$\alpha$-methyl-2-hydroxybenzylidene-3'-methyl-6'-(methacryloylamino)-2'-N-benzothiazolo-azine.

The ultraviolet-absorbing monomers of the invention are copolymerized with at least one other monomer containing at least one ethylenic group, such as acrylic acid, methacrylic acid, $\alpha$-chloro-acrylic acid, the esters and amides derived from acrylic acid, $\alpha$-chloro-acrylic acid and methacrylic acid such as acrylamide, methacrylamide, ethyl acrylate, n-butyl acrylate, 2-ethylhexyl acrylate and lauryl methacrylate, vinyl esters such as vinyl acetate, vinyl propionate and vinyl laurate, acrylonitrile, methacrylonitrile, aromatic vinyl compounds such as styrene and its derivatives e.g. vinyltoluene, vinylacetophenone, and sulphostyrene, itaconic acid, citraconic acid, crotonic acid, vinylidene chloride, vinyl alkyl ethers such as vinyl ethyl ether, maleic acid esters, N-vinyl-2-pyrrolidone, N-vinylpyridine, 2- and 4-vinylpyridine.

The ethylenically unsaturated monomers suited for copolymerization with the ultraviolet-absorbing monomers corresponding to the above general formula may be chosen so that physical and/or chemical properties of the resulting copolymer such as its insolubility in water, its compatibility with the binder of a photographic colloid composition, into which the copolymer is to be incorporated, its flexibility, its thermal stability, etc. are favourably influenced. It is possible to introduce e.g. plasticizing groups in the ultraviolet-absorbing copolymer by using a comonomer carrying such groups, thus favourably influencing the brittleness and flexiblity of the layers, into which the copolymer is to be incorporated.

The invention is limited to the incorporation of the ultraviolet-absorbing copolymers of the invention as primary dispersions into ultraviolet-absorbing filter layer compositions for the reasons set forth below. Indeed, these latices may contain high percentages of copolymer e.g. concentrations of up to 60% by weight and yet possess a relatively low viscosity. When said latices are incorporated into emulsions, the viscosity of the latter is not influenced. With secondary dispersions of copolymers or with solutions of the copolymers in organic solvents, such high concentrations can never be attained. The viscosity of their mixtures with aqueous gelatin solutions increases so fast with rising concentrations that coating becomes completely impossible. Moreover, by the use of the primary dispersions there can be dispensed with the use of organic solvents or alkaline solutions as well as with special dispersing techniques for incorporating the ultraviolet-absorbing copolymers.

We prefer to add the ultraviolet-absorbing copolymers of the invention to the hydrophilic colloid binder material in the form of a primary dispersion. Indeed, the particle size of secondary dispersions is often larger and the stability of these dispersions is found to be inferior to that of the primary dispersions. Besides, the concentration of the primary dispersions may be much higher than could be attained with secondary dispersions. Moreover, the secondary dispersions are not so compatible with hydrophilic colloids e.g. gelatin. When admixed, e.g., with aqueous gelatin solutions they usually produce mat layers. The primary dispersions are usually quite compatible with aqueous gelatin solutions so that very clear layers can be obtained indeed.

The hydrophilic colloid binder may be gelatin, colloidal albumin, zein, casein, a hydrophilic cellulose derivative such as hydroxyethyl cellulose or a synthetic hydrophilic colloid such as polyvinyl alcohol and poly-N-vinylpyrrolidone. If desired compatible mixtures of two or more of the hydrophilic colloids may be employed.

The primary dispersion of hydrophobic ultraviolet-absorbing copolymer is mixed with an aqueous solution of a hydrophilic colloid binder material in such a ratio that between about 8 and 40% by weight of ultraviolet-absorbing copolymer, calculated on the total weight of the dry ultraviolet-absorbing filter layer, is present. The concentration of the ultraviolet-absorbing compositions is not critical. Usually 0.2 to 1 g. of ultraviolet-absorbing copolymer is used per square meter of filter layer. The optimum coating concentrations depend on the particular ultraviolet-absorbing copolymer used, on the particular photographic element to be protected, and on the extent of protection desired. The optimum coating concentrations for a given photographic element can be determined by methods well known in the art.

The ultraviolet-absorbing copolymers of the invention are not only used in filter layers or in photographic light-sensitive materials, but also in optical filters such as camera filter and filters in different kinds of densitometers.

The ultraviolet-absorbing copolymers can be mixed in primary dispersion form with an aqueous solution of a colloidal binder, e.g. gelatin, cellulose esters, synthetic resins such as polyvinyl acetals and hydrolyzed polyvinyl acetate. The resulting mixture is coated on the light-sensitive layer of the photographic element. When the photographic element is intended for use in colour photography, the ultraviolet filter layer need not be an outer layer. The filter layer may indeed be applied over one of the layers subject to the harmful effects of ultraviolet radiation. The ultraviolet-absorbing layer may also be coated directly on the support, which may have been provided with (a) known subbing layer(s) before the application of light-sensitive layers thereto. Finally, the mixture of primary dispersion of ultraviolet-absorbing copolymer and of an aqueous solution of a hydrophilic colloid binder material may be incorporated into films, foils, or layers of plastics, or coated as a layer thereon, and the resulting products can be used as protective filter layers or films, e.g. in optical filters and in filters used in densitometers, and as protective coatings on layers containing substances susceptible to degradation or change under the action of ultraviolet radiation, e.g. photographic colour prints.

The description has been restricted to the use of primary dispersions of ultraviolet-absorbing copolymers of monomers comprising a benzothiazole group. In the same way corresponding monomers comprising a benzoxazole, benzoselenazole or a benzimidazole group can be copolymerized in emulsion with α,β-ethylenically unsaturated monomers in order to form primary dispersions that also can be mixed with an aqueous solution of a hydrophilic colloid binder material such as gelatin. The resulting compositions may be applied as ultraviolet-absorbing filter layers to all kinds of materials and especially to photographic materials.

The following preparations describe the manufacture of the ultraviolet-absorbing monomers and their emulsion copolymerization with other ethylenically unsaturated monomers.

For preparing a first group of the ultraviolet-absorbing monomers one can start from substituted benzaldehydes or substituted acetophenones. These are condensed with 2-hydrazono-benzothiazoles by refluxing in a solvent of equivalent amounts of the starting products. The reaction product is then collected either by simple cooling or by pouring onto ice and filtering the precipitate with suction. After crystallization from a solvent the reaction product is obtained in pure state.

The products obtained are then reacted either directly with acryloyl chloride or methacryloyl chloride, or only after they have been saponified or reduced previously according to the substituents present.

According to this general scheme are the following preparations 1 to 8.

PREPARATION 1

By condensing for 24 hours 2-hydrazono-3-methylbenzothiazole with 2-acetylaminoacetophenone in ethylene glycol monomethyl ether and after pouring the reaction mixture onto ice, collecting the precipitate and crystallizing from ethanol, α-methyl-2-acetylaminobenzylidene-3'-methyl-2'-N-benzothiazolo-azine is obtained. Melting point: 170° C.

85 g. of this product were added to a solution of 50 g. of sodium hydroxide in 850 ml. of ethylene glycol monomethyl ether and 85 ml. of water. The reaction mixture was refluxed for 24 h. and then poured onto ice, whereupon the precipitate obtained was filtered with suction, washed with water, dried, and recrystallized from ethanol. The product obtained is α-methyl-2-amino-benzylidene-3'-methyl-2'-N-benzothiazolo-azine. Melting point: 145° C.

29.6 g. of this product were dissolved in 225 ml. of acetonitrile and 12 ml. of pyridine, and after stirring at room temperature 14 ml. of methacryloyl chloride, diluted with 100 ml. of acetonitrile were added dropwise. The temperature rose to about 40° C. At this temperature the mixture was stirred for one further hour, whereupon the reaction mixture was cooled in ice. The precipitate formed was filtered with suction, washed with acetonitrile and dried. After crystallization from 500 ml. of acetonitrile to which 20 ml. of acetic acid had been added, α-methyl - 2 - (methacryloylamino)-benzylidene-3'-methyl-2'-N-benzothiazolo-azine was obtained. Melting point: 175° C.

Analogously to this preparation α-methyl-4-(methacryloylamino) - benzylidene - 3' - methyl-2'-N-benzothiazolo-azine and α-methyl-3-(methacryloylamino-benzylidene - 3' - methyl - 2' - N - benzothiazolo-azine could be synthesized.

PREPARATION 2

By condensing 2-hydrazono-3-methyl-benzothiazole and 3-nitrobenzaldehyde for 28 hours in ethylene glycol monomethyl ether, and after cooling and filtering the precipitate with suction, 3-nitro-benzylidene-3'-methyl-2'-N-benzothiazolo-azine was obtained. Melting point: 216° C.

From this product 60 g. were suspended at 80° C. in 950 ml. of acetic acid. Then 218 g. of tin(II) chloride-2-water and 240 ml. of concentrated hydrochloric acid were added dropwise, whereupon the obtained mixture was stirred for 3 further hours. The reaction mixture was poured in 5 N hydrochloric acid, whereupon the obtained precipitate was filtered with suction, washed with water, dried and extracted with chloroform. The solution in chloroform was evaporated and the residue was recrystallized from butanol. The obtained product was 3-amino-benzylidene-3'-methyl-2'-N-benzothiazolo-azine melting at 169° C.

Analogously to the latter part of Preparation 1, 3-methacryloylamino) - benzylidene - 3' - methyl-2'-N-benzothiazolo-azine was prepared therefrom by using dioxan as a solvent. Melting point: 180° C.

PREPARATION 3

By condensing 6-nitro-2-hydrazono-3-methylbenzothiazole with 2-hydroxyacetophenone for 6 hours in dimethylformamide, cooling, filtering the precipitate obtained with suction washing with methanol, α-methyl-2-hydroxy-benzylidene - 3' - methyl - 6' - nitro-2'-N-benzothiazolo-azine was obtained melting at 260° C.

From this product 31 g. were brought in 500 ml. of ethylene glycol monomethyl ether at 100° C. with stirring, whereupon in 10 min. 61 g. of sodium sulphide-9-water were added. Then the mixture was stirred for one further hour.

The reaction mixture was poured onto ice, and the precipitate obtained was filtered with suction and washed with water. After having dissolved this precipitate in chloroform and precipitated anew in n-hexane, α-methyl-2-hydroxy - benzylidene - 3' - methyl-6'-amino-2'-N-benzothiazoloazine was obtained melting at 178° C. Of this product 18.5 g. were dissolved in a mixture of 50 ml. of pyridine and 100 ml. of acetonitrile. Then 8.36 ml. of methacryloyl chloride diluted with 25 ml. of acetonitrile were added dropwise with stirring at room temperature. This mixture was stirred for further 30 min. The precipitate obtained was filtered with suction and washed with acetonitrile. Then it was dissolved in chloroform for purifying and precipitated anew with n-hexane. The product obtained was α-methyl-2-hydroxy-benzylidene-3'-methyl-6'-(methacryloylamino) - 2' - N - benzothiazoloazine melting at 178° C.

PREPARATION 4

2-hydrazono-3-methyl-benzothiazole was made to react for 4 hours with 3-methoxy-4-hydroxy-benzaldehyde in ethanol. After cooling and filtering the precipitate with suction, 3 - methoxy - 4 - hydroxy-benzylidene-3'-methyl-2'-N-benzothiazoloazine was obtained melting at 164° C.

37.6 g. of this product were dissolved in a mixture consisting of 300 ml. of acetonitrile and 57 ml. of pyridine, and stirred at 60° C. Then a solution of 56.5 ml. of methacryloyl chloride in 120 ml. of acetonitrile was added dropwise. After 2 hours of stirring the reaction mixture was poured in ice, and the precipitate obtained was filtered with suction, washed with water and dried. After recrystallization from a mixture of equal parts by volume of ethanol and ethylene glycol monomethyl ether, and after a second recrystallization from acetonitrile, 3-methoxy-4-(methacryloyloxy) - benzylidene - 3' - methyl-2'-N-benzothiazolo-azine was obtained melting at 169° C.

Analogously to this product also α-phenyl-2-hydroxy-4 - (methacryloyloxy) - benzylidene-3'-methyl-2'-N-benzothiazolo-azine could be prepared.

PREPARATION 5

Analogously to the process of the first part of Preparation 4, 4 - hydroxybenzylidene - 3' - methyl-2'-N-benzothiazolo-azine melting at 255° C. was obtained by condensing 2-hydrazono-3-methylbenzothiazole and 4-hydroxybenzaldehyde for 18 hours. From the obtained product and according to the second part of Preparation 4, 4 - (methacryloyloxy) - benzylidene-3'-methyl-2'-N-benzothiazolo-azine was obtained after crystallization from a mixture of equal parts of ethanol and ethylene glycol monomethyl ether. Melting point: 167° C.

PREPARATION 6

Analogously to the first part of Preparation 1, α-methyl-4-hydroxy - benzylidene-3'-methyl-2'-N-benzothiazolo-azine was obtained from 2-hydrazono-3-methyl-benzothiazole and 4-hydroxy-acetophenone after a reaction time of 48 hours. The reaction product obtained was poured onto ice and recrystallized from toluene. Melting point: 192° C. This product was then transformed with methacryloyl chloride according to the process described in the latter part of Preparation 4, and recrystallized from ethylene glycol monomethyl ether so as to form α-methyl-4-(methacryloyloxy)-benzylidene-3'-methyl-2'-N-benzothiazolo-azine melting at 153° C.

PREPARATION 7

Analogously to the first part of Preparation 1, first α-methyl-3-hydroxybenzylidene-3'-methyl - 2' - N-benzothiazolo-azine was obtained from condensing 2-hydrazono-3-methyl-benzothiazole and 3-hydroxy-acetophenone for 24 hours, pouring out the reaction mixture on ice, and recrystallizing the precipitate from a mixture of benzine and xylene. The purified reaction product was then transformed with methacryloyl chloride according to the process of the latter part of Preparation 4, and recrystallized from ethanol yielding α-methyl - 3 - (methacryloyloxy)-benzylidene-3'-methyl-2'-N-benzothiazolo-azine.

PREPARATION 8

Analogously to the first part of Preparation 2, 3-hydroxy-benzylidene - 3' - methyl-2'-N-benzothiazolo-azine was formed by condensing 2-hydrazono-3-methyl-benzothiazole and 3-hydroxy-benzaldehyde for 24 hours. The reaction product was transformed with methacryloyl chloride according to the latter part of Preparation 4 and then recrystallized from a mixture of equal parts of ethanol and ethylene glycol monomethyl ether. Then it was recrystallized for a second time from acetonitrile yielding 3 - (methacryloyloxy)-benzylidene-3'-methyl-2'-N-benzothiazolo-azine.

In the following preparations first hydroxyethoxybenzaldehydes or hydroxyethoxy-acetophenones were prepared. For this purpose hydroxybenzaldehyde or hydroxy-acetophenone is dissolved in dimethylformamide and anhydrous sodium carbonate or potassium carbonate are added together with ethylene chlorhydrine and refluxed for 1 or 2 hours with stirring. The reaction mixture is filtered and washed with dimethylformamide, whereupon the filtrate is evaporated and the residue distilled or recrystallized. To the obtained hydroxyethoxybenzaldehydes or hydroxy - ethoxy - acetophenones the above described reactions with 2-hydrazone-benzothiazoles are applied.

PREPARATION 9

1 mole of 3-methoxy-4-hydroxy-benzaldehyde was dissolved in 1 litre of dimethylformamide, and to this mixture three equivalents of sodium carbonate and two equivalents of ethylene-chlorohydrine were added. This mixture was refluxed for 1 hour. The mixture was filtrated and the precipitate obtained washed with dimethylformamide, whereupon the filtrate was evaporated to dryness and the residue was recrystallized from benzene. The obtained 3-methoxy-4-(β-hydroxyethoxy)-benzaldehyde was condensed for 1 hour with 2-hydrazono-3-methyl-benzothiazole according to the method of the first part of Preparation 2 so as to obtain 3-methoxy-4-(β-hydroxyethoxy)-benzylidene-3'-methyl-2'-N-benzothiazolo-azine.

Of the product 555 g. were dissolved in 5,330 ml. of anhydrous dioxan and 750 ml. of pyridine with stirring at 60° C. Then a solution of 733 ml. of methacryloyl chloride in 1600 ml. of dioxan were added dropwise, which mixture was then stirred for 1 further hour at 60° C.

The reaction mixture was poured into ice-water and the precipitate obtained was filtered with suction and washed with water. After crystallization from a mixture of ethanol and acetic acid (10/3 parts by volume) 3-methoxy - 4 - (β-methacryloyloxy - ethoxy)-benzylidene-3'-methyl-2'-N-benzothiazolo-azine was obtained.

PREPARATION 10

A solution of 1 mole of 2-hydroxy-benzaldehyde in 1 litre of dimethylformamide was mixed with 4.5 equivalents of sodium carbonate and 2 equivalents of ethylene-chlorhydrine, which mixture was refluxed for 1½ hours. The mixture was filtered, washed with dimethylformamide and distilled so as to obtain 2-(β-hydroxyethoxy)-benzaldehyde. According to the process described in the first part of Preparation 1 this product was condensed with 2-hydrazone-3-methyl - benzothiazole in ethylene glycol monomethyl ether as a solvent. For purifying benzene was used. The obtained product was 2-(β-hydroxyethoxy)-benzylidene-3′-methyl-2′-N-benzothiazolo-azine.

According to the process described in the latter part of Preparation 9 this azine was condensed with methacryloylchloride, and the reaction product was crystallized from ethanol. The obtained product is 2-(β-methacryloyloxyethoxy)-benzylidene - 3′ - methyl-2′-N-benzothiazolo-azine.

PREPARATION 11

1 mole of 4-hydroxyacetophenone was dissolved in 1 litre of dimethylformamide and then together with 2 equivalents of potassium carbonate and 2 equivalents of ethylene chlorhydrine refluxed for 1 hour with stirring. The reaction mixture was filtrated and the precipitate formed washed with dimethylformamide. After distillation 4-(β-hydroxyethoxy)-acetophenone was obtained.

This product was condensed for 24 hours with 2-hydrazono-3-methylbenzothiazole and ethanol as a solvent according to the process of the first part of Preparation 2. The obtained product was α-methyl-4-(β-hydroxyethoxy)-benzylidene-3′-methyl-2′-N-benzothiazolo-azine.

According to the process of the latter part of Preparation 9 this azine was condensed with methacryloyl chloride, and after crystallization from ethanol α-methyl-4-(β-methacryloyloxyethoxy)-benzylidene - 3′ - methyl-2′-N-benzothiazolo-azine was formed.

PREPARATION 12

A solution of 1 mole of 4-hydroxy-benzaldehyde in 1 litre of dimethylformamide together with 4.5 equivalents of sodium carbonate and 2 equivalents of ethylene chlorhydrine was refluxed for 2 hours. After distillation 4-(β-hydrozono-3-methylbenzothiazole in ethanol as solvent This benzaldehyde was condensed for 5 hours with 2-hydraazono-3-methylbenzothiazole in ethanol as solvent according to the method of the first part of Preparation 2. After crystallization from ethylene glycol monomethyl ether 4-(β - hydroxyethoxy)-benzylidene-3′-methyl-2′-N-benzothiazolo-azine was obtained.

According to the method of the latter part of preparation 9 this azine was condensed with methacryloyl chloride, so that after recrystallization from ethanol 4-(β-methacryloyloxyethoxy) - benzylidene - 3′-methyl-2′-benzothiazole-azine was obtained.

PREPARATION 13

Primary dispersion of copoly(n-butyl acrylate/3-methoxy-4-(β-methacryloyloxy - ethoxy) - benzylidene-3′-methyl-2′-N-benzothiazolo-azine)

In a reaction flask equipped with a stirrer, a reflux condenser, a nitrogen inlet, two dropping funnels and a thermometer, 2.5 liter of demineralized water, 240 g. of 3-methoxy-4-(β - methacryloyloxy-ethoxy) - benzylidene-3′-methyl-2′-N-benzothiazolo-azine, prepared according to Preparation 9, and 30 g. of sodium salt of oleylmethyl tauride were placed. This mixture was stirred slowly for 30 min. while the flask was rinsed with nitrogen. Then the mixture was heated to 75° C., whereupon 90 g. of n-butyl acrylate were added, and the temperature was raised to 90–95° C. Then 30 ml. of 5% aqueous solution of the sodium salt of 4,4′-azo-bis(4-cyanovaleric acid) were added as an initiator. After stirring for 10 min., 270 g. of n-butyl acrylate and 60 ml. of the same 5% initiator solution were added dropwise through the respective dropping funnels in a period of 15 min. Immediately thereafter a further amount of 30 ml. of the initiator solution was added, whereupon the mixture was stirred for another 30 min. at 95° C. The mixture continued to reflux gently, and again 30 ml. of initiator solution were added. The reaction mixture was stirred for 1 hour and 30 min. at 95° C., and then 435 ml. of liquid were distilled from the latex obtained. The remaining latex was cooled and filtrated. Yield: 2.8 litre of beige latex containing 17.15% of solid matter and having a pH of 6.5.

From a sample of this latex the copolymer formed was separated by freeze-drying and purified. It appeared from the sulphur analysis that the copolymer contained 52.8% by weight of ultraviolet-absorbing monomer. The copolymer consisted of the following recurring units:

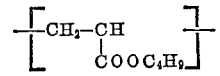

and

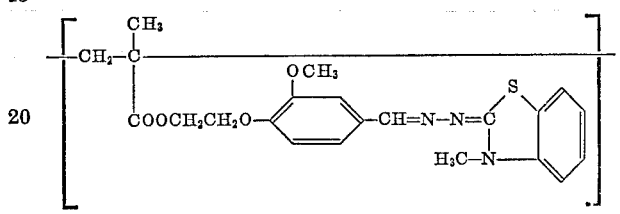

PREPARATION 14

Primary dispersion of copoly(methyl methacrylate/3-methoxy - 4 - (β-methacryloyloxy-ethoxy)-benzylidene-3′-methyl-2′-N-benzothiazolo-azine)

In a reaction vessel equipped for emulsion polymerization such as set forth in Preparation 13, 225 ml. of demineralized water, 3 g. of sodium salt of oleylmethyltauride, 24 g. of 3-methoxy-4-(β-methacryloyloxyethoxy)-benzylidene-3′-methyl - 2′ - N - benzothiazolo-azine prepared according to Preparation 9, and 36 g. of distilled methyl methacrylate were placed. The mixture was stirred for 30 min. under nitrogen atmosphere. Then it was heated to 80–83° C., and as an initiator 24 ml. of 5% aqueous solution of sodium salt of 4,4′-azo-bis-(cyanovaleric acid) were added dropwise with stirring over 30 min. Then the temperature was brought to 90° C. After 1 hour of stirring at 90° C. the latex was freed from traces of residual monomer by evaporating about 30 to 40 ml. of liquid under slightly reduced pressure. Then the latex was cooled and 250 ml. of beige composition were obtained, which were filtrated.

Content of solid matter of the latex: 22.4%. It appeared from the sulphur analysis on the separated and purified copolymer that it contained 41.8% by weight of ultraviolet-absorbing monomer. This copolymer consisted of recurring units of the following formulae:

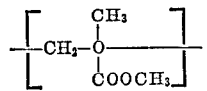

and

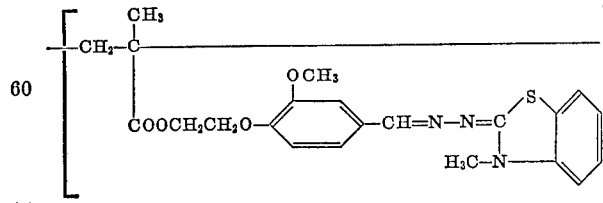

PREPARATION 15

Primary dispersion of copoly(n-butyl acrylate/2-(β-methacryloyloxy - ethoxy) - benzylidene - 3′-methyl-2′-N-benzothiazolo-azine)

In a reaction flask equipped as described in Preparation 13 were placed 2.8 l. of demineralized water, 36.25 mg. of sodium salt of oleylmethyl tauride, and 290 g. of 2-(β-methacryloyloxy-ethoxy)-benzylidene - 3′ - methyl-2′-N-benzothiazolo-azine prepared according to Preparation 10.

The suspension obtained was stirred at room temperature for 20 min., rinsed with nitrogen and then heated to 94° C. As soon as this temperature was reached, 435 g. of n-butyl acrylate were added and the mixture was stirred for 5 min., whereupon 290 ml. of 5% aqueous solution of the sodium salt of 4,4'-azo-bis(4-cyanovaleric acid) were added as an initiator. The mixture was then thoroughly stirred for 90 min., whereupon another quantity of 145 ml. of 5% initiator solution was added. Then the mixture was polymerized for further 2 hours at 95° C., whereafter the latex was freed from residual monomer by evaporating under slightly reduced pressure at 90° C. The latex was then cooled and filtrated. Yield: 3.040 litre of latex of pH 6.75 and having a content of solid matter of 22.6%.

As post-stabilizer 800 mg. of sodium salt of oleyl methyl tauride were added for each 100 ml. of latex. It appeared from the sulphur analysis on the copolymer that it contained 44.4% by weight of ultraviolet-absorbing monomer, and was composed of recurring units of the following formulae:

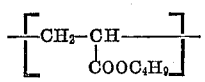

and

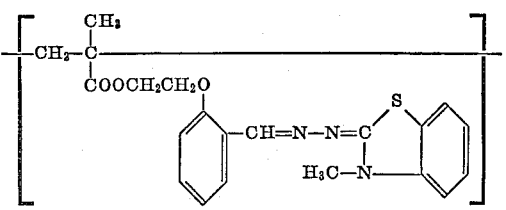

PREPARATION 16

Primary dispersion of copoly(n-butyl acrylate/4-(β-methacryloyloxy - ethoxy) - benzylidene-3'-methyl-2'-N-benzothiazole-azine)

In a reaction flask equipped for emulsion polymerization as described in Preparation 13 were placed 340 ml. of demineralized water and 4 g. of sodium salt of oleyl methyl tauride. This mixture was stirred for 15 min. while the atmosphere in the flask was rinsed with nitrogen. Then the reaction mixture was heated to 92° C., and a solution of 48 g. of distilled n-butyl acrylate and 32 g. of 4 - (β-methacryloyloxy-ethoxy)-benzylidene-3'-methyl-2'-N-benzothiazole-azine prepared according to Preparation 12, heated to 80° C., was added at once.

The mixture was then stirred for 5 min., while the temperature was maintained at 92–93° C. A slight reflux takes place. Then 6.4 ml. of 5% aqueous solution of sodium salt of 4,4'-azo-bis,4-cyanovaleric acid) were added dropwise in 1 min. as an initiator solution. After 15 min. another amount of 6.4 ml. of the same initiator solution, and after stirring for 45 min. at 92–95° C. another amount of 2 ml. initiator solution was added, whereupon the mixture was stirred for a further hour at 92–93° C. The latex was then freed from residual monomer by distilling the azeotrope of butyl acrylate and water under reduced pressure.

After cooling the yellow latex was filtrated, and 350 ml. of latex with a content of solid matter of 16% and a pH of 6.2 were obtained. It appeared from the sulphur analysis on the separated copolymer that it was composed of recurring units of the formulae:

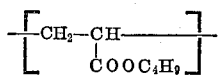

and

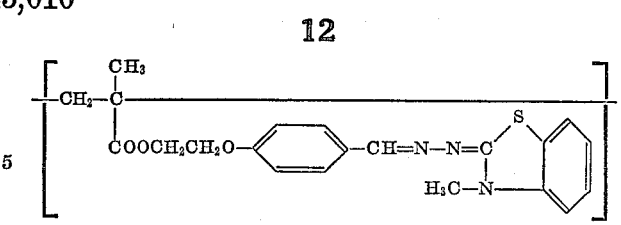

The respective parts of these units were 42 and 58% by weight respectively.

PREPARATION 17

Primary dispersion of co[n-butyl acrylate/4-(methacryloyloxy) - benzylidene - 3' - methyl-2'-N-benzothiazole-azine]

In a flask equipped for emulsion polymerization were placed 20 g. of 4-(methacryloyloxy)-benzylidene-3'-methyl-2'-N-benzothiazole-azine prepared according to Preparation 5, 250 ml. of demineralized water, and 2.5 g. of sodium salt of oleylmethyltauride. This mixture was stirred for 30 min. while the flask was rinsed with nitrogen. Then the mixture was heated to 70° C. In a dropping funnel were placed 30 g. of n-butyl acrylate from which ¼ part was added to the reaction mixture that was heated to 93° C. Then the remaining ¾ parts of n-butyl acrylate was added dropwise in 5 min. together with 8 ml. of 5% aqueous solution of sodium salt of 4,4'-azo-bis(cyanovaleric acid) as initiator solution. The reaction mixture was stirred for 30 min. at 93° C., and another amount of 2 ml. of the same initiator solution was then added. After stirring for further 30 min. a new amount of 10 ml. of initiator solution was added, and the whole was stirred at 90–93° C. for 2 hours. The residual n-butyl acrylate was then eliminated by evaporating under reduced pressure. After filtering, 220 ml. of latex were obtained having a pH of 6.5 and a concentration of solid matter of 15.5%.

It appeared from the nitrogen analysis that the separated copolymer contained 34.35% by weigh of ultraviolet-absorbing monomer. The copolymer was composed of recurring units of the following formulate:

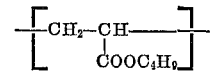

and

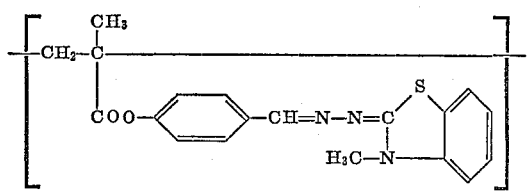

Analogously to Preparation 17 primary dispersions can be formed by replacing in the reaction mixture the ultraviolet-absorbing monomer by a corresponding amount of one of the following monomers:

3-(methacryloyloxy)-benzylidene-3'-methyl-2'-N-benzothiazoloazine (Preparation 8)

α-methyl-4-(methacryloyloxy)-benzylidene-3'-methyl-2'-N-benzothiazolo-azine (Preparation 6)

α-methyl-3-(methacryloyloxy)-benzylidene-3'-methyl-2'-N-benzothiazolo-azine (Preparation 7)

3-methoxy-4-(methacryloyloxy)-benzylidene-3'-methyl-2'-N-benzothiazolo-azine (Preparation 4)

3-(methacryloylamino)-benzylidene-3'-methyl-2'-N-benzothiazolo-azine (Preparation 2)

α-methyl-4(β-methacryloyloxy-ethoxy)-benzylidene-3'-methyl-2'-N-benzothiazole-azine (Preparation 11).

PREPARATION 18

In Preparation 13 has been described in process for the manufacture in relatively small quantities of a primary dispersion of copoly(n - butyl acrylate/3-methoxy-4(β-methacryloyloxy - ethoxy) - benzylidene-3'-methyl-2'-N-benzothiazoloazine). In this preparation much greater quantities of a similar primary dispersion are manufactured.

In a reaction vessel of 20 l. equipped with a stirrer, a reflux condenser, a nitrogen inlet, two dropping funnels and a thermometer were brought 12.2 l. of demineralized water, 1440 g. of 3 - methoxy-4-(β-methacryloyloxy-ethoxy) - benzylidene - 3' - methyl - 2'-N-benzothiazolo-azine) and 180 g. of the sodium salt of oleylmethyl tauride. The mixture was stirred slowly and heated to 82° C. When this temperature was reached 2160 g. of n-butyl acrylate were added at once and the whole further heated while stirring to 95° C. The mixture began to reflux slightly. At 95° C. were added in 30 min. as polymerisation initiator 1440 ml. of a 5% aqueous solution of the sodium salt of 4,4'-azo-bis(4-cyanovaleric acid). Stirring was continued for 60 min. at 95–97° C., whreafter again 720 ml. of the initiator solution were added. Polymerisation was continued for another 90 min. whereafter the latex formed was heated for about 2 hours under a slight vacuum to distil off the residual monomer and a certain quantity of the water present. After cooling the latex was filtrated .15 l. of a beige-latex was obtained containing 22.4% by weight of solid matter and having a pH of 6.95.

The copolymer particles in the latex had an average diameter of 500 A. As post-stabilizer 1,012 mg. of the sodium salt of oleylmethyl tauride were added. The latex was miscible with gelatin.

It appeared from a sulphur analysis that the copolymer was formed of the same recurring units as in Preparation 13 and contained 44.1% by weight of ultraviolet-absorbing monomer.

PREPARATION 19

In Preparation 15 has been described a process for the manufacture in relatively small quantities of a primary dispersion of copoly(n-butyl acrylate)2-(β-methacryloyloxy - ethoxy) - benzylidene - 3' - methyl - 2' - N - benzo-thiazoloazine. In this preparation much greater quantities of a similar primary dispersion are manufactured.

In a reaction vessel of 20 l. equipped as described in Preparation 18 were placed 12.6 l. of demineralized water, 164 g. of the sodium salt of oleylmethyl tauride and 1315 g. of 2 - (β - methacryloyloxy - ethoxy) - benzylidene-3'-methyl - 2' - N - benzothiazolo-azine. The space above the liquid was rinsed for 30 min. with a stream of nitrogen. The suspension is then heated while stirring to 90° C. whereupon 1960 g. of n-butyl acrylate were added. When the temperature was again 90° C. were added at once as initiator 1310 ml. of a 5% aqueous solution of the sodium salt of 4,4' - azo-bis-(4 - cyanovaleric acid). After polymerization for 90 min. at 94° C. another 656 ml. of the initiator solution were added and polymerisation is continued for 2 hours.

The latex formed was freed from residual monomer by distillation and thereafter cooled and filtrated. 12.250 liter of latex were obtained having a solid matter content of 20.57% by weight and a pH of 6.55. The copolymer particles in the latex had an average diameter of 450 A. The latex was completely miscible with gelatin.

It appeared from a sulphur analysis that the copolymer was formed of the same recurring units as in Preparation 15 and contained 48.6% by weight of ultraviolet-absorbing monomer.

The following examples illustrate this invention.

EXAMPLE 1

4.7 kg. of dry gelatin were allowed to swell at room temperature in 10 litre of distilled water for 45 min. Then this gelatin suspension is melted at maximum 50° C. in a warm water bath. The following ingredients were added:

| | Ml. |
|---|---|
| Butylester of sulphonate castor oil | 2300 |
| Phenol | 470 |
| 5% solution of formaldehyde in distilled water | 660 |

To the solution formed the following dye solutions were added:

90 g. of Supracen red 3B (C.I. 68,215) dissolved in 12 litre of distilled water 36.64 g. of Toluidine blue (C.I. 63,340) dissolved in 5 litre of distilled water Supracen red 3B is a trade name of Farbenfabriken Bayer AG, Leverkusen, W.-Germany, and Toluidine blue is a trade name of Farbwerke Hoechst AG, Frankfurt/M. W.-Germany.

Then 800 ml. of primary dispersion of copoly[n-butyl acrylate/2 - (β - methacryloyloxy-ethoxy)-benzylidene-3' - methyl - 2' - N - benzothiazolo-azine] prepared according to Preparation 15 were added. After filtering, the solution was poured on a glass plate at a ratio of 1 litre per sq. m. and dried. In this manner as ultraviolet-adsorbing selection filter was obtained, which could be used as camera filter in photography and as a filter in a densitometer. It was very resistant against ultraviolet radiation.

EXAMPLE 2

4.7 kg. of dry gelatin were allowed to swell for 45 min. at room temperature in 10 litre of distilled water, whereupon the gelatin suspension was melted in a warm water bath, whose temperature must not exceed 50° C. To the suspension the following ingredients were added:

| | Ml. |
|---|---|
| Butyl ester of sulphonated castor oil | 2300 |
| Phenol | 470 |
| 5% solution of formaldehyde in distilled water | 660 |
| Primary dispersion of co[n-butyl acrylate/3-methoxy - 4 - (β-methacryloyloxy-ethoxy)-benzylidene - 3' - methyl - 2' - benzothiazoloazine] prepared according to Preparation 13 | 670 |

After filtration the solution obtained was poured to a glass plate at a ratio of 1 litre/m.$^2$ and dried. In this way an ultraviolet-absorbing filter was obtained that could be used as a camera filter in photography and as a filter in a densitometer. The filter had an absolute maximum of absorption at 358 nm. and a molar extinction coefficient of $3.1 \times 10^{-4}$. It was very resistant to ultraviolet radiation.

EXAMPLE 3

A photographic multilayer material as used for the preparation of direct-positive colour images was formed. Each of the three integrally coated emulsion layers was sensitized to one of the primary colours, namely blue, green, and red. The top layer was sensitive to blue light and contained a colour coupler for the yellow image. The middle layer was sensitive to green light and contained a colour coupler for the magenta image, whereas the bottom layer was sensitive to red light and contained a colour coupler for the cyan image. A yellow filter layer separated the blue-sensitive and the green-sensitive layers. The different colour couplers and oxidizing coupling compounds were those described in Example 10 of the United Kingdom patent specification 990,628. Then 95.6 ml. of primary dispersion of copoly[n-butyl acrylate/ 2-(β-methacryloyloxy-ethoxy)-benzylidene - 3' - methyl-2' - N - benzothiazolo-azine] from Preparation 15 were added to 400 ml. of distilled water, wherein 25 g. of gelatin had been dissolved. This mixture was diluted with distilled water to a volume of 500 ml. and its pH was adjusted to 7 by the addition of sodium hydroxide. Finally, 5 ml. of saponine and 2 ml. of a 1.25% aqueous solution of chrome alum were added.

On the resulting multilayer colour reversal photographic material was then coated an ultraviolet-absorbing layer from the thus formed coating composition at a ratio of 50 g./m.² whereupon this layer was then dried. After processing in the known photographic baths for colour reversal photographic materials the film was subjected to resistance tests. They consisted in exposing the material for 30 h. to the radiation of a 200 watt xenone lamp, and for 48 h. at 60° C. at a relative humidity of 95% respectively. In both cases the film protected by the ultraviolet-absorbing layer did not show any signs of yellowing or fading, whereas in an analogous multilayer colour reversal photographic material that did not comprise an ultraviolet-absorbing layer considerable changes took place in the colour rendering.

EXAMPLE 4

The ultraviolet-absorbing layer of Example 3 was coated on a conventional colour reversal photographic film to serve as a camera filter. The resulting colour reversal transparency was completely free from blue shadowing and blue fringing.

In the same way a conventional colour negative film was coated with a latex of an ultraviolet-absorbing copolymer according to Preparation 6 mixed with an aqueous solution of gelatin. The ultraviolet-absorbing layer completely eliminated blue shadowing and blue fringing in the resulting processed colour negative.

EXAMPLE 5

The process of Example 3 was repeated, but the 95.6 ml. of primary dispersion of copoly[n-butyl acrylate/2-(β-methacryloyloxy-ethoxy)-benzylidene - 3' - methyl - 2'-N-benzothiazoloazine] were replaced by 67.5 ml. of primary dispersion of copoly [n-butyl acrylate/3-methoxy-4-(β-methacryloyloxy-ethoxy)-benzylidene - 3' - methyl-2'-N-benzothiazolo-azine] from Preparation 13.

Here also the film protected by the ultraviolet-absorbing layer, after being exposed for 30 h. to the radiation of a 2000 watt xenone lamp, did not show any signs of yellowing or fading, whereas in an analogous multilayer colour reversal photographic material that did not comprise an ultraviolet-absorbing layer, considerable changes took place in the colour rendering.

EXAMPLE 6

The rearside of a multilayer colour reversal photographic material was coated with a solution of gelatin and an antihalation dye containing 10 g. of the primary dispersion of the ultraviolet-absorbing copolymer of Preparation 15 for each gram of gelatin at a ratio of 1.5 g. of gelatin per m.². The resulting antihalation layer served to protect a diapositive colour material from light striking the rearside of the material, as occurs during projection or in diapositive show-glasses. The antihalation dye could be a known organic dye or common colloidal black silver. The results obtained with this ultraviolet-absorbing backing layer were excellent.

EXAMPLE 7

A paper sheet coated with a baryta layer was covered with a gelatin layer containing per gram of gelatin 15 g. of primary dispersion of the ultraviolet-absorbing copolymer prepared according to Preparation 15. The resulting ultraviolet-absorbing layer was coated with a series of light-sensitive photographic layers and other layers to produce a multicolour photographic material. The consecutive layers were the following:

(1) a blue-sensitive gelatin silver chlorobromide emulsion containing a coupler for yellow,
(2) a gelatin interlayer,
(3) a green-sensitive gelatin silver chlorobromide emulsion containin a colour coupler for magenta,
(4) a gelatin interlayer,
(5) a red-sensitive gelatin silver chlorobromide emulsion containing a colour coupler for cyan,
(6) a gelatin protection overcoat.

The resulting sensitive multicolour photographic material could be exposed and processed to produce the desired dye image. The material was very fast to light and did not show any signs of yellowing and fading.

The same latex of Preparation 15 could also be applied alone or in admixture with an aqueous solution of gelatin to a colour print or paper by spraying or brushing to form a protective layer against ultraviolet radiation.

We claim:
1. A photographic element comprising a light-sensitive material protected against ultraviolet radiation by an ultraviolet-absorbing composition which is a mixture of an aqueous solution of a hydrophilic colloid binder material and a primary dispersion having a concentration of 5 to 60 percent by weight of a hydrophobic ultraviolet-absorbing co-polymer obtained by emulsion polymerization of at least one alpha, beta-ethylenically unsaturated monomer with an ultraviolet-absorbing, solid, water-insoluble monomer of the formula

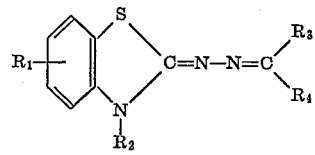

wherein:
$R_1$ represents a hydrogen atom, an acryloyloxy group, a methacryloyloxy group, an acryloylamino group, or a methacryloylamino group,
$R_2$ represents a hydrogen atom, a methyl group, an ethyl group, or a phenyl group,
$R_3$ represents a hydrogen atom, an alkyl group of 1 to 4 carbon atoms, or a phenyl group, and
$R_4$ represents a hydrogen atom, or, when $R_1$ is a hydrogen atom, and acryloyloxy- or methacryloyloxy-substituted phenyl group; and acryloylamino- or methacryloylamino-substituted phenyl group, an acryloyloxy-alkoxy- or methacryloyloxyalkoxy-substituted phenyl group, wherein these phenyl groups may comprise a further substituent taken from a hydroxy group or an alkoxy group of 1 to 4 carbon atoms;
said ultraviolet-absorbing monomer constituting between about 2 to 70 percent by weight of total monomer present, and said hydrophobic co-polymer forming between 8 and 40 percent by weight of the total weight of dry ultraviolet-absorbing composition.

2. A photographic element according to claim 1 wherein the ultraviolet-absorbing composition is applied as a filter layer on top of a light-sensitive silver halide emulsion layer.

3. A photographic element according to claim 1 wherein the ultraviolet-absorbing filter layer is applied as an interlayer between the support and a light-sensitive silver halide emulsion layer.

4. A photographic element according to claim 1 wherein said hydrophilic colloid binder material is gelatin.

5. A photographic element according to claim 4 wherein said ultraviolet-absorbing monomer is 2-(β-methacryloyloxy - ethoxy) - benzylidene-3'-methyl-2'-N-benzothiazoloazine.

6. A photographic element according to claim 4 wherein said ultraviolet-absorbing monomer is 3-methoxy-4-(β-methacryloyloxyethoxy) - benzylidene-3'-methyl-2'-N-benzothiazolo-azine.

7. A finished photographic element comprising a support having thereon a plurality of developed and fixed photographic light-sensitive silver halide emulsion layers containing developed dye images subject to fading by the action of ultraviolet radiation, said finished photographic element being protected by the application thereto of an ultraviolet-absorbing composition which is a mixture of an aqueous solution of a hydrophilic colloid binder material and a primary dispersion having a concentration of 5 to 60 percent by weight of a hydrophobic ultraviolet-absorbing co-polymer obtained by emulsion polymerization of at least one alpha, beta-ethylenically unsaturated monomer with an ultraviolet-absorbing, solid, water-insoluble monomer of the formula:

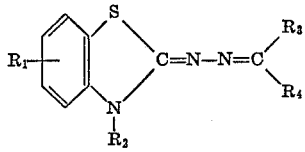

wherein:
$R_1$ represents a hydrogen atom, an acryloyloxy group, a methacryloyloxy group, and acryloylamino group, or a methacryloylamino group,
$R_2$ represents a hydrogen atom, a methyl group, an ethyl group, or a phenyl group,
$R_3$ represents a hydrogen atom, an alkyl group of 1 to 4 carbon atoms, or a phenyl group, and
$R_4$ represents a hydrogen atom, or, when $R_1$ is a hydrogen atom, an acryloyloxy- or methacryloyloxy-substituted phenyl group; an acryloylamino- or methacryloylamino-substituted phenyl group, an acryloyloxyalkoxy- or methacryloyloxyalkoxy-substituted phenyl group, wherein these phenyl groups may comprise a further substituent taken from a hydroxy group or an alkoxy group of 1 to 4 carbon atoms;

said ultraviolet-absorbing monomer constituting between about 2 and 70 percent by weight of total monomer present, and said hydrophobic co-polymer forming between 8 and 40 percent by weight of the total weight of dry ultraviolet-absorbing composition.

8. A finished photographic element according to claim 7 wherein said hydrophilic colloid binder material is gelatin.

9. A finished photographic element according to claim 7 wherein said ultraviolet-absorbing monomer is 2-($\beta$-methacryloyloxyethoxy) - benzylidene - 3' - methyl-2'-N-benzothiazolo-azine.

10. A finished photographic element according to claim 7 wherein said ultraviolet-absorbing monomer is 3- methoxy - 4 - ($\beta$-methacryloyloxy-ethoxy)-benzylidene-3'-methyl-2'-N-benzothiazole-azine.

References Cited
UNITED STATES PATENTS
3,417,082  12/1968  Taylor _____ 96—84 R RONALD H. SMITH, Primary Examiner U.S. Cl. X.R.

252—300